(12) United States Patent
Buckrell et al.

(10) Patent No.: US 8,297,372 B2
(45) Date of Patent: Oct. 30, 2012

(54) SOIL AERATION DEVICE HAVING CLOSE-COUPLED SHAFTS

(75) Inventors: Allan Buckrell, Norwich (CA); Wayne Graham, Burgessville (CA)

(73) Assignee: SAF-HOLLAND Canada Limited, Norwich, Ontario (CA)

( * ) Notice: Subject to any disclaimer, the term of this patent is extended or adjusted under 35 U.S.C. 154(b) by 393 days.

(21) Appl. No.: 11/505,367

(22) Filed: Aug. 17, 2006

(65) Prior Publication Data

US 2008/0053671 A1 Mar. 6, 2008

(51) Int. Cl.
*A01B 45/02* (2006.01)

(52) U.S. Cl. ............ 172/21; 172/65; 172/520; 172/540; 172/594

(58) Field of Classification Search ............ 172/21, 172/22, 27, 49, 65, 520, 540, 584, 595, 600, 172/616, 651, 70, 82, 89, 98, 141, 161, 162, 172/204, 228, 594

See application file for complete search history.

(56) References Cited

U.S. PATENT DOCUMENTS

| | | | | |
|---|---|---|---|---|
| 143,941 A * | 10/1873 | Svenzen | 172/241 |
| 260,342 A * | 6/1882 | Williamson | 172/540 |
| 273,101 A * | 2/1883 | Kay | 172/49 |
| 274,066 A * | 3/1883 | Ward | 172/631 |
| 304,959 A * | 9/1884 | Robinson | 172/241 |
| 357,724 A * | 2/1887 | McSherry | 172/595 |
| 381,464 A * | 4/1888 | Crane | 172/69 |
| 419,415 A * | 1/1890 | Chauff | 172/393 |
| 425,148 A * | 4/1890 | Shores | 172/540 |
| 435,584 A * | 9/1890 | Horn | 172/49 |
| 466,771 A * | 1/1892 | Clark | 172/520 |
| 570,532 A * | 11/1896 | Anderson | 172/49 |
| 583,397 A * | 5/1897 | Hagstrom et al. | 172/104 |
| 633,465 A * | 9/1899 | Mertes | 172/349 |
| 747,573 A * | 12/1903 | Allen | 172/349 |
| 836,588 A * | 11/1906 | Laursen | 172/540 |
| 839,887 A * | 1/1907 | Peters | 172/418 |
| 1,008,708 A * | 11/1911 | Eidem | 171/89 |
| 1,047,042 A * | 12/1912 | Gonzales | 172/393 |
| 1,109,813 A * | 9/1914 | Aspfors | 172/393 |
| 1,145,653 A * | 7/1915 | Andersen | 172/540 |
| 1,320,875 A * | 11/1919 | Lesh | 172/349 |
| 1,324,407 A * | 12/1919 | Peterson | 172/529 |
| 1,389,512 A * | 8/1921 | Juopperi | 172/49 |
| 1,490,514 A * | 4/1924 | Knutson | 172/540 |
| 1,760,203 A * | 5/1930 | Menke | 171/89 |
| 1,807,182 A * | 5/1931 | Stoner | 172/21 |
| 1,812,708 A * | 6/1931 | Rudolf et al. | 172/549 |
| 2,171,768 A * | 9/1939 | Sjogren et al. | 172/583 |
| 2,267,943 A * | 12/1941 | Ogg | 172/153 |
| 2,614,375 A * | 10/1952 | Calkins | 172/520 |

(Continued)

*Primary Examiner* — Jamie L McGowan
(74) *Attorney, Agent, or Firm* — Price Heneveld LLP

(57) ABSTRACT

An agricultural implement for towing over fields, for incorporating crop residues into soil, possessing a pair of juxtaposed, substantially parallel, spaced-apart, rotatable shafts, comprising a first forwardly-mounted shaft and a second rearwardly-mounted shaft, each mounted on a frame transversely to a direction of travel of said implement. A plurality of protruding tine members, extending substantially radially outwardly from each of said pair of shafts and longitudinally spaced along each of said pair of shafts, each tine member adapted to rotate about a longitudinal axis of a respective shaft, a tip of each of said tine members when rotating about said respective shaft creating a circular arc, are further provided. The circular arcs of the tine members on one of said pair of shafts interdigitate with a corresponding plurality of circular arcs of said tine members on said other of said pair of shafts.

16 Claims, 9 Drawing Sheets

U.S. PATENT DOCUMENTS

| | | | |
|---|---|---|---|
| 2,881,847 A * | 4/1959 | Strasel | 172/21 |
| 2,948,345 A * | 8/1960 | Brewster | 172/49 |
| 4,202,414 A * | 5/1980 | vom Braucke et al. | 172/42 |
| 4,291,770 A * | 9/1981 | Engler | 172/185 |
| 4,383,580 A * | 5/1983 | Huxford | 172/21 |
| 4,840,232 A * | 6/1989 | Mayer | 172/21 |
| 5,082,064 A | 1/1992 | Landoll et al. | |
| 5,419,402 A * | 5/1995 | Heintzman | 172/551 |
| 5,579,847 A | 12/1996 | Postema | |

* cited by examiner

SOIL AERATION DEVICE HAVING CLOSE-COUPLED SHAFTS

FIELD OF THE INVENTION

This invention relates to agricultural implements, and in particular to a soil aeration apparatus.

BACKGROUND OF THE INVENTION AND DESCRIPTION OF THE PRIOR ART

Various prior art agricultural implements exist for aerating soil.

FIG. 1 herein shows one example of a prior art soil aeration device 1 which is the subject of U.S. Pat. No. 4,383,580. Such device 1 comprises a frame 14, and uses a pair of rotatable shafts 2,3 each having a longitudinal axis of rotation 30 substantially aligned with that of the other, each mounted perpendicular or substantially perpendicular to the direction of travel 'A' of the device. Each shaft 2,3 possesses a plurality of radially outwardly extending tine members 22, which penetrate and cut the soil as the rotatable shafts are moved over the soil.

FIG. 2 shows another example of a prior art device 5 which is the subject of U.S. Pat. No. 4,840,232 assigned to Holland Equipment Ltd. Such device 5 similarly utilizes a frame 14 and a plurality of rotatable shafts 2,3, rotatably mounted thereon, each shaft 2,3 having a plurality of longitudinally spaced radially outwardly extending tine members 22, which penetrate and cut the soil as the rotatable shafts a 2,3 are moved over the soil. Longitudinal axis 30 of the respective rotatable shafts are capable of being adjustably inclined from 70°-90° to the direction of travel of the device by means of a plurality of bolt holes in frame 14 thereof.

Similar devices are disclosed in U.S. Pat. Nos. 5,690,179, 5,823,269, 5,101,910, 4,094,363, and 5,570,846.

U.S. Pat. Nos. 6,691,791 and 7,055,617 each teach a soil aeration apparatus device, having first and second substantially parallel shafts rotatably coupled to a carrier, each shaft having a plurality of soil aerating tines attached thereto, and a gear system to rotate each of the first and second shafts while revolving the first and second shafts about a central axis of the carrier.

Disadvantageously, with increasing use of zero or minimum tillage farming practices in large scale farming, aeration of non-tilled fields having crop residues thereon with aeration devices of the prior art typically results in such units having the tines thereof becoming clogged with residual stalks from previously-harvested crops such as corn, canola, wheat (straw), barley (straw), soybeans, and the like.

Although tillage of such fields with a tillage device such as a disc cultivator (as opposed to an aeration device) is an alternative option to permit working of the crop residues back into the soil, tillage is precisely what is attempted to be avoided with modern day zero-till or minimum till practices, due to the large soil disturbance and resulting difficulty with wind and water erosion of the tilled soil.

Accordingly, a real need exists in the farming industry for aeration devices which are able to leave the soil in a substantially undisturbed form, but yet are able to perform on fields having substantial crop residues thereon without clogging.

A further real need exists in the farming industry for an aeration implement that is able to mulch or cut stalks of crop residues lying on the surface of the soil, to better work them into the soil during aeration so as to thereby improve the aeration of the soil and the fiber content of the soil, both of which increase fertility and crop yield from the soil.

SUMMARY OF THE INVENTION

The present invention comprises, in a broad aspect, an agricultural implement having at least a pair of closely mounted parallel rotatable shafts, comprising a forwardly mounted shaft and a rearwardly mounted shaft each having longitudinal axis of rotation mounted transverse to the direction of travel, further having radially outwardly extending tine members longitudinally spaced along the longitudinal axis of each shaft.

Importantly, circular arcs of the tine members, when rotated about the respective rotatable shaft, intersect each other preferably along the trailing edge of the forwardly mounted shaft and the leading edge of the rearwardly mounted shaft. Such implement, when passed over soil, is thus able to cut or mulch crop residues at the locations of interdigitation of the tines. Where the tine members are further adapted to contact and penetrate the ground over which the implement is passed for the purpose of aerating the soil, such device is further able to cutting the stalks of crop residues which may be lying on the surface of the soil and push or "pin" them into the soil simultaneously during soil aeration.

The agricultural implement of the present invention thus permits the realization of at least two important functions, namely the capacity to i) aerate the soil over which such implement passes, which may have crop residues thereon, without becoming clogged and ineffective, and further in addition either ii) cutting or mulching crop residues which may be present on the surface of the soil over which such implement passes to further permit incorporation of such crop residues into the soil; and/or iii) "pinning" or partially pushing stalks of crop residues into the soil over which the implement is passed, to increase the organic content thereof and thus the fertility of such soil.

Accordingly, in one broad aspect of the present invention, such invention comprises:

a frame;

at least a pair of juxtaposed, substantially parallel, spaced-apart, rotatable shafts, comprising a first forwardly-mounted shaft and a second rearwardly-mounted shaft, each mounted on said frame substantially transverse to a direction of travel of said implement;

a plurality of protruding tine members, extending substantially radially outwardly from each of said pair of shafts, longitudinally spaced along each of said pair of shafts, each tine member adapted to rotate about a longitudinal axis of a respective shaft, a tip of each of said tine members when rotating about said respective shaft creating a circular arc; and circular arcs of a plurality of said tine members on one of said pair of shafts inter-digitating with a corresponding plurality of circular paths of said tine members on said other of said pair of shafts.

The aforesaid inter-digitating preferably occurs at a location along a leading edge of one (the most forward) of the pair of shafts and along a trailing edge of said other (the most rearward) of said pair of shafts. Advantageously, such inter-digitation permits tine members on respective shafts to cut or mulch crop residues, such as stalks of corn, wheat (straw), barley (straw), soybean, or canola left on fields after harvesting, particularly at the area of interdigitation, thereby allowing improved incorporation of such crop residues into the soil during the simultaneous aeration of the soil by the tine members of the agricultural implement of the present invention.

Specifically, the tine members are preferably further adapted, when rotating about the rotatable shafts, to aerate the soil by contacting and penetrating the soil during a portion of their rotation, and cut or mulch crop residues, and in particular fibrous stalks such as corn, soybean, or canola stalks, and further press or pin such cuttings or crop residues into the aerated soil, as well as cut or mulch such stalks at the area of interdigitation, both improving the aeration of the soil by pushing mulched crop residue into fissures in the soil which then better permits air to enter and contact the opened soil, and further cutting the crop residues into smaller portions which are better able to be incorporated into the soil during the tine aeration process.

The tine members are adapted to contact the ground and penetrate the ground as the implement is towed over said ground. The tine members in a preferred embodiment are substantially planar, and possess a cutting edge which engages and penetrates the ground and further may be used to assist in cutting stalks from crop residues. The tine members of the implement, when passed over fields having crop residues thereon in the form of dried stalks, cut said stalks proximate said locations of inter-digitation.

In another broad aspect of the present invention, such invention comprises an agricultural implement adapted for passage in an intended direction of travel over fields having crop residues thereon, comprising:
a frame;
at least one pair of juxtaposed, substantially parallel, spaced-apart rotatable shafts, mounted on said frame, each having a longitudinal axis at a transverse angle of 45°-90° to said intended direction of travel of said implement;
said pair of rotatable shafts each having a plurality of radially outwardly extending members adapted for engaging the ground, tips thereof when rotated about said respective shafts forming a circular arc; and
circular arcs of each of said outwardly extending members on one of said rotatable shafts intersecting circular arcs of outwardly extending members of a respective other of said rotatable shafts.

In a preferred embodiment of the above-described invention the angle of transverse mounting of each rotatable shaft axis is adjustable, in a range from approximately perpendicular to the direction of travel, to an angle of about 45° to the direction of travel.

In order to most effectively cut stalks of residual crop residues which may lie on the surface of the soil, in a preferred embodiment each of said rotatable shafts rotate in the same direction about their respective longitudinal axes, so that upwardly rotating tines on the trailing edge of the most forward rotatable shaft move in an opposite direction to tines on the leading edge of the most rearward rotatable shaft.

The radially outwardly extending tines which are mounted on the rotatable shafts are adapted not only to cut crop residues on the surface of the soil as they are passed over the soil, but further penetrate and cut the ground and in doing so at least partially "pin" and thereby incorporate stalks from crop residues into soil over which said implement passes.

In yet a further embodiment of the present invention, the invention comprises an agricultural implement for chopping and mulching crop residues, adapted for passage over a field containing said crop residues, comprising:
a frame;
at least a pair of juxtaposed, substantially parallel, spaced-apart, rotatable shafts, mounted on said frame transversely to a direction of travel of said implement, adapted for rotation in a substantially horizontal plane;
a plurality of protruding ground-penetrating members, extending substantially radially outwardly from each of said pair of shafts and longitudinally spaced along each of said pair of shafts, adapted to contact the ground and penetrate the ground as the implement is towed over said ground, each ground-penetrating member adapted to rotate about a longitudinal axis of a respective shaft, a tip of each of said ground penetrating members when rotating about said respective shaft creating a circular arc;
circular arcs of each of said ground penetrating members on one of said pair of shafts inter-digitating with circular paths of each of said ground penetrating members on said other of said pair of shafts; and
wherein said ground-penetrating members of each of said shafts, when said shafts are caused to rotate and pass over fields having crop residues thereon in the form of dried stalks, cut said stalks at locations of inter-digitation.

The ground-penetrating members, in addition to preferably cutting the stalks, further at least partially incorporate the stalks into soil over which said implement passes.

Lastly, in a still-further embodiment of the present invention, such invention comprises an agricultural implement adapted for towing behind a tractor, further adapted to chop and mulch crop residues and further simultaneously partially incorporate said crop residue into soil when towed over said soil, comprising:
a frame;
at least one pair of juxtaposed, substantially parallel, spaced-apart rotatable shafts, mounted on said frame, comprising a first forwardly-mounted shaft and a second rearwardly-mounted shaft, each having a longitudinal axis at an angle of 45°-90° with respect to an intended direction of travel of said implement;
said pair of rotatable shafts having a plurality of radially outwardly extending members, tips thereof when rotated about said respective shafts forming a circular arc; and
circular arcs of each of said outwardly extending members on one of said rotatable shafts intersecting circular arcs of outwardly extending members of a respective other of said rotatable shafts.

In all preferred embodiments of the agricultural implement of the present invention, the implement of the present invention is preferably mounted on and coupled to a 3-point hitch of a tractor. Of course, other means of mounting such an implement to a towing vehicle may be used, and many means will now be apparent to those familiar with agricultural implements.

Other means of passing this device over the soil, other than by towing behind a tractor, will be apparent to those skilled in the area, such as by self-contained or self-propelled means, or as a component of another agricultural implement which is self-propelled or itself towed by a towing vehicle over the soil.

BRIEF DESCRIPTION OF THE DRAWINGS

Further advantages and permutations will appear from the following detailed description of various non-limiting embodiments of the invention taken together with the accompanying illustrative drawings in which.

DETAILED DESCRIPTION OF SOME PREFERRED EMBODIMENTS

Figure 1:
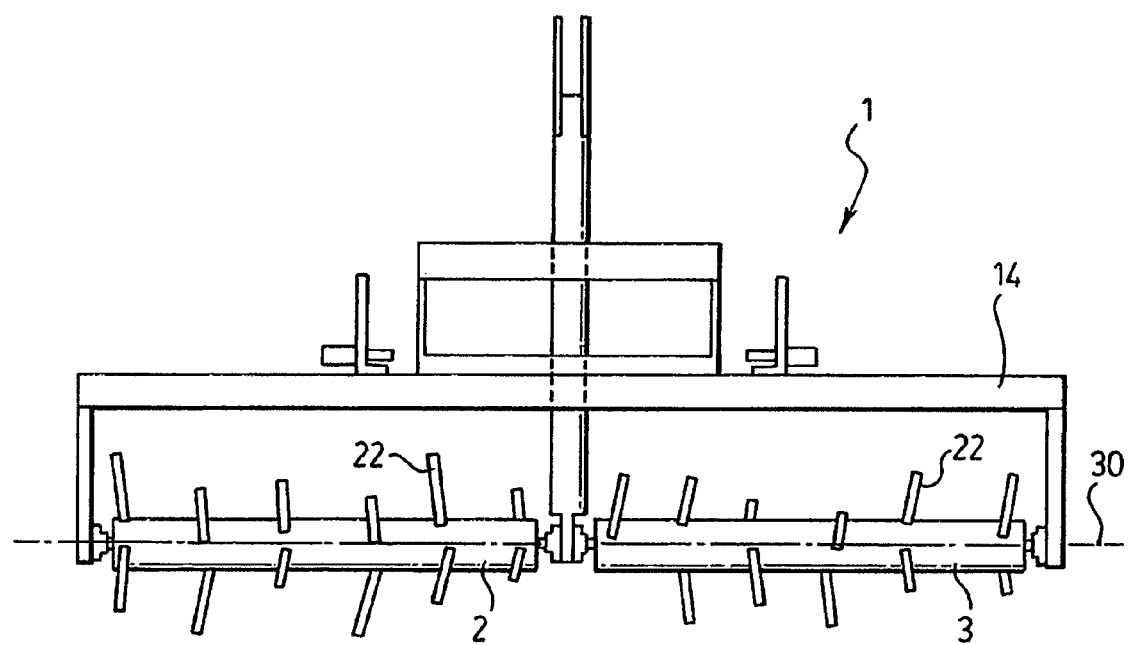
FIG. 1 is a schematic top view of a soil aeration apparatus of the prior art, having a pair of rotatable shafts having radially outwardly extending tines extending from each of said shafts.
Figure 2:
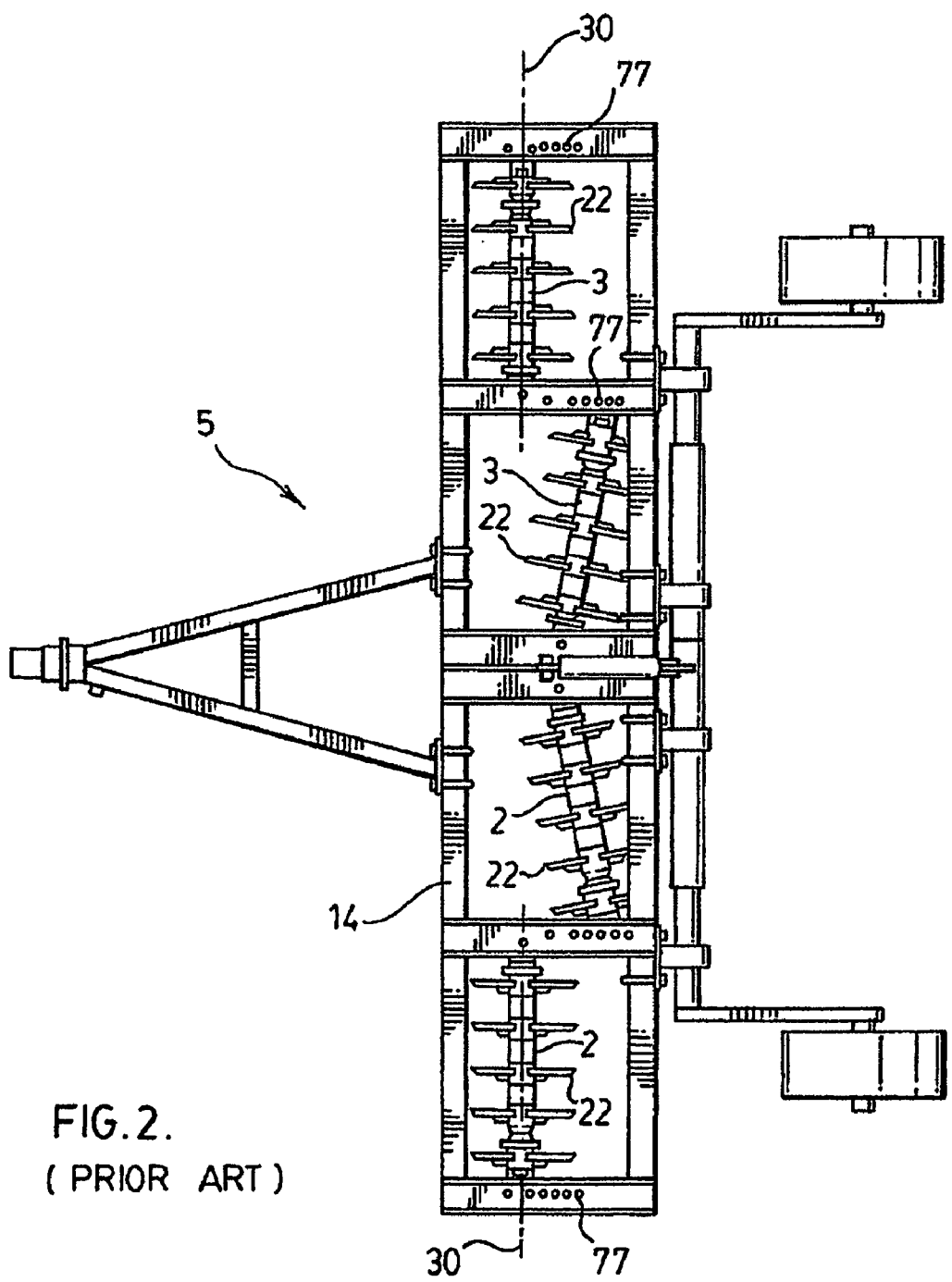
FIG. 2 is a top view of a more elaborate soil aeration apparatus of the prior art, wherein the longitudinal axis of the rotatable shafts may be adjusted to variably position the rotatable shafts transverse to the direction of travel of the implement.

In all figures, for consistency, identical components are identified with identical reference numerals.

FIGS. 3-7 show two permutations of an agricultural implement of the present invention, namely a soil aeration device 10. Such device 10 in the preferred embodiments shown in the aforesaid FIGS. 3-7 is adapted, by means of three hardpoint attachments 12, for mounting onto a 3-point hitch of a tractor, to allow such device 10 to be towed by such tractor (not shown) over soil 15 that is desired to be aerated.

The aeration device 10 comprises a frame 14, having mounted thereon, two pairs of substantially parallel, spaced-apart rotatable shafts 18a, 18b, and 20a, 20b respectively. Each pair of shafts 18a, 18b and 20a, 20b comprises a forwardly-mounted shaft 18a, 20a, and a rearwardly-mounted shaft respectively, each mounted on frame 14 transverse to the direction of travel of device 10.

Shafts 18a, 18b, and 20a, 20b are mounted on frame 14 via end-mount members 70, and are preferably journalled for rotation by means of bearing and bearing housing 75 at end-mounts 70, although other means of rotatably mounting the shafts 18a, 18b and 20a, 20b will now occur to those skilled in the field.

Figure 8:
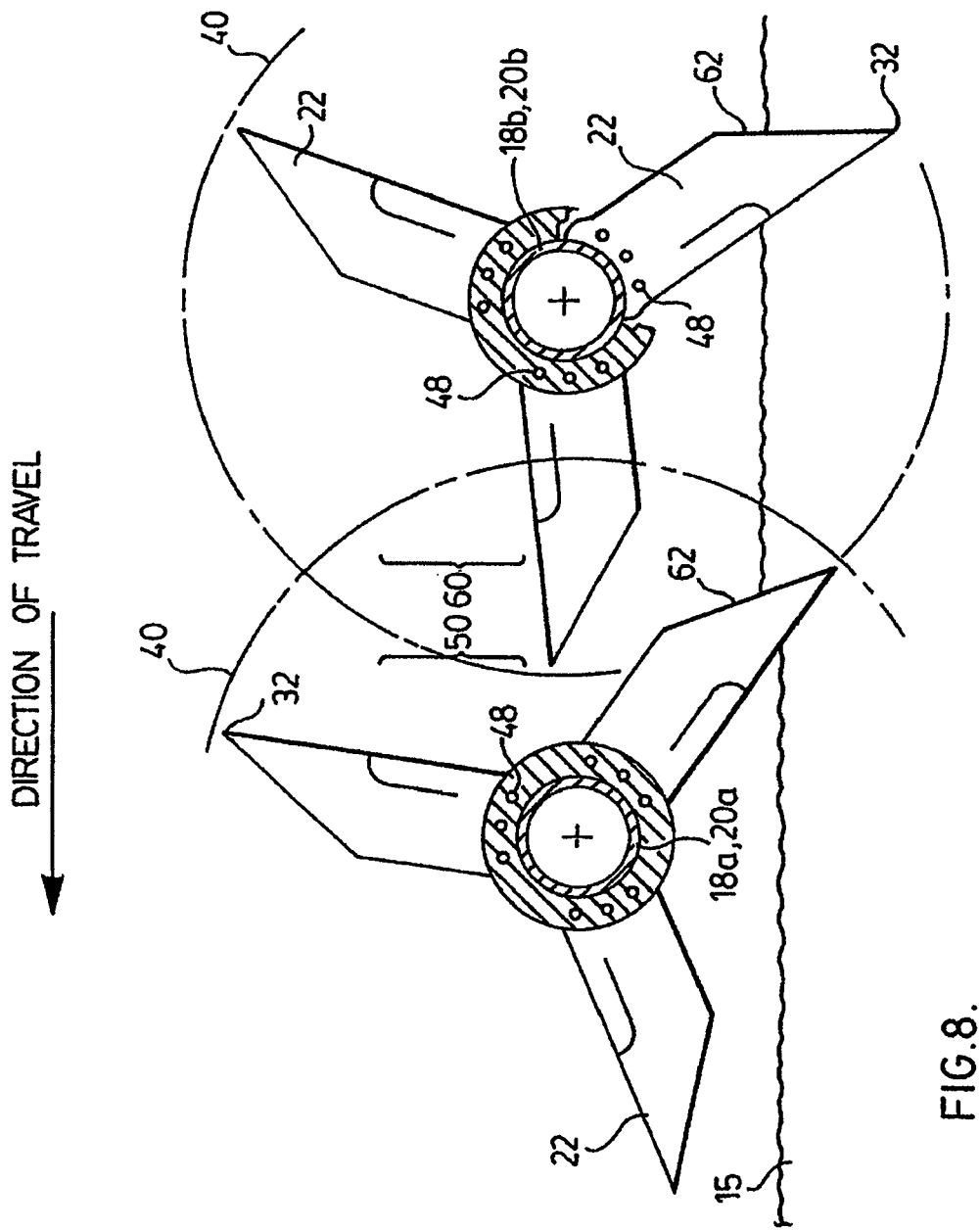
FIG. 8 is a partial cross-sectional view taken along plane D-D of FIG. 7, showing the overlap of the circular arcs made by the tips of each of the time members mounted on adjacent rotating shafts.
Figure 9:
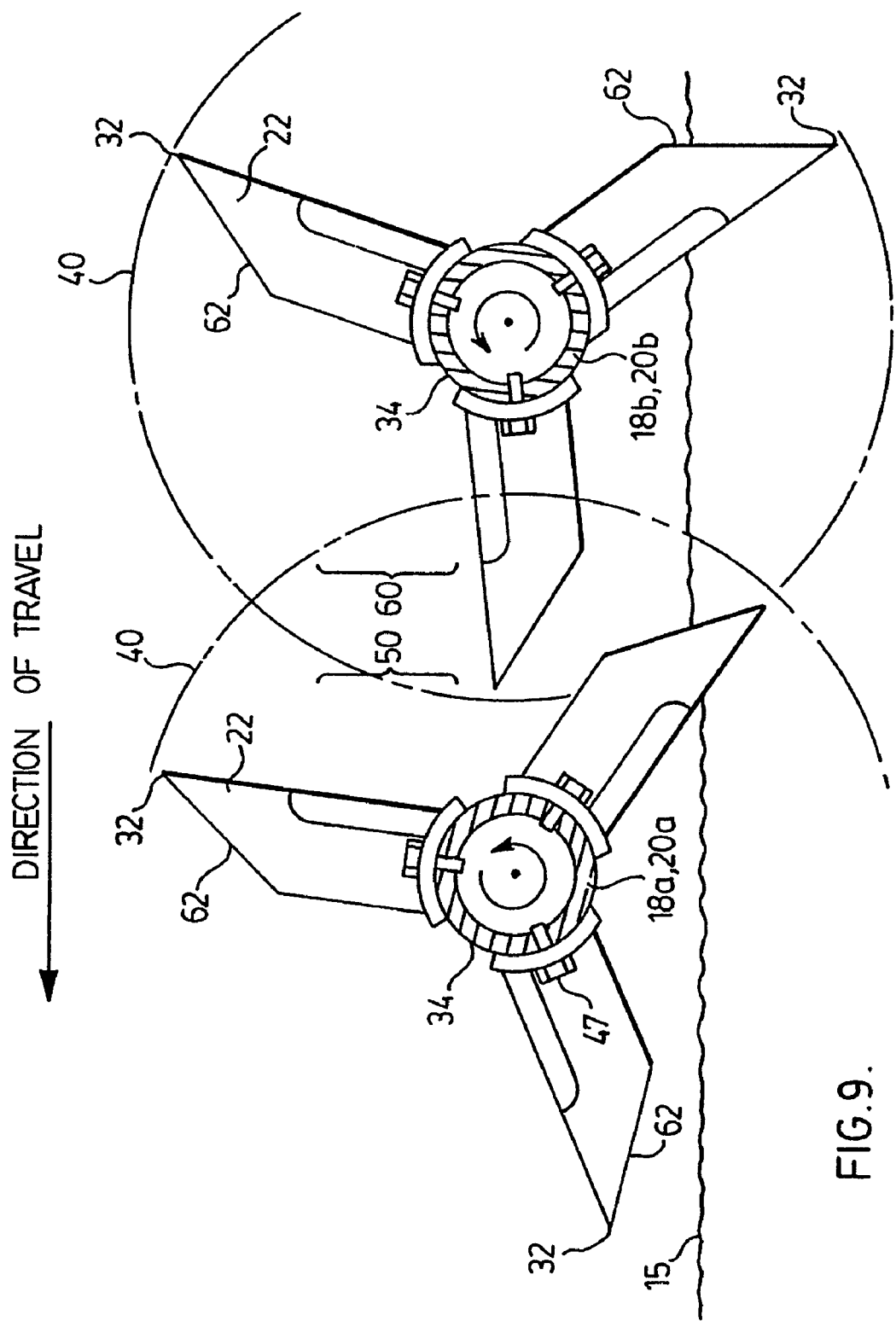
FIG. 9 is a similar view to that shown in FIG. 8, showing an alternative manner of mounting the tines to the rotatable shafts

Each rotatable shaft 18a, 18b and 20a, 20b possesses a plurality of protruding tines 22, extending substantially radially outwardly from each of said shafts 18a, 18b and 20a, 20b and spaced evenly about a periphery 34 of rotatable shafts 18a, 18b, and 20a, 20b, as shown best in FIGS. 8 & 9. In the embodiments shown in all of the figures, each of three tines 22 are substantially co-planar (although R is contemplated they may have several degrees of twist and/or tilt to aid in aeration when penetrating the soil, as disclosed in US Publ No. 20050077059 published Apr. 14, 2005, also commonly assigned to the assignee of this invention, namely Holland Equipment Ltd.), and are evenly spaced 120° from each of the other tines 22 in a common plane, and evenly spaced longitudinally along the longitudinal axis of each rotatable shaft 18a, 18b and 20a, 20b. Each tine 22 is adapted to rotate, with the respective shaft 18a,18b, 20a, 20b to which it is affixed, about a longitudinal axis 30 of a respective shaft 18a, 18b and 20a, 20b.

As shown best in FIGS. 8 & 9, tip 32 of each tine member 22, when rotating about a respective shaft 18a, 18b and 20a, 20b, is adapted to create a circular arc 40. Circular arcs 40 of tines 22, due to close mounting of pairs of rotatable shafts 18a to 18b, and 20a to 20b on frame 14, intersect with circular arcs 40 of other tines 22 mounted on the other of the pair of rotatable shafts, as best shown in FIGS. 4 & 6, and FIGS. 8 & 9.

Figure 4:
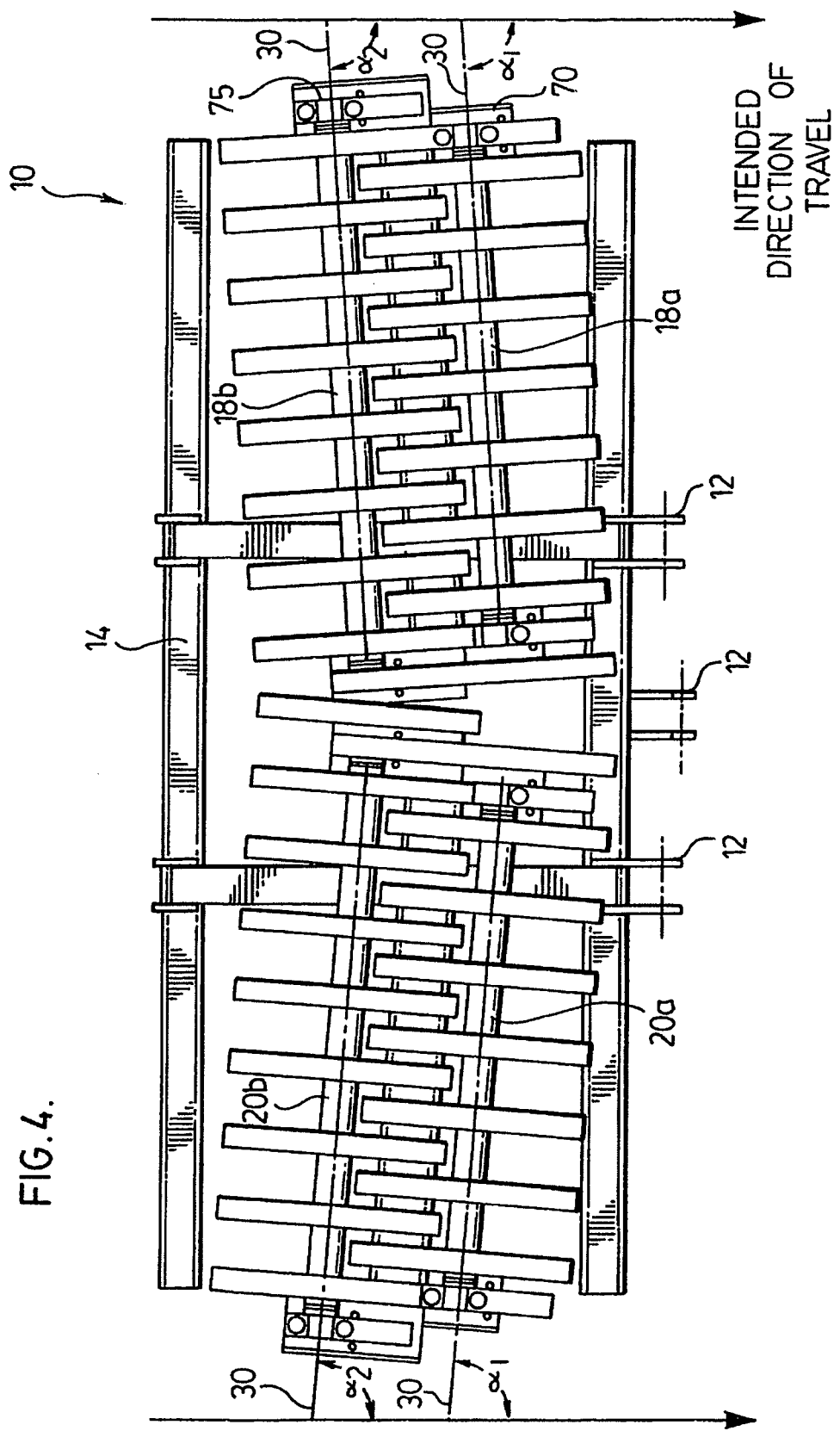
FIG. 4 is a top semi-schematic view of the embodiment of the invention shown in FIG. 3, taken in the direction of arrow "A"
Figure 6:
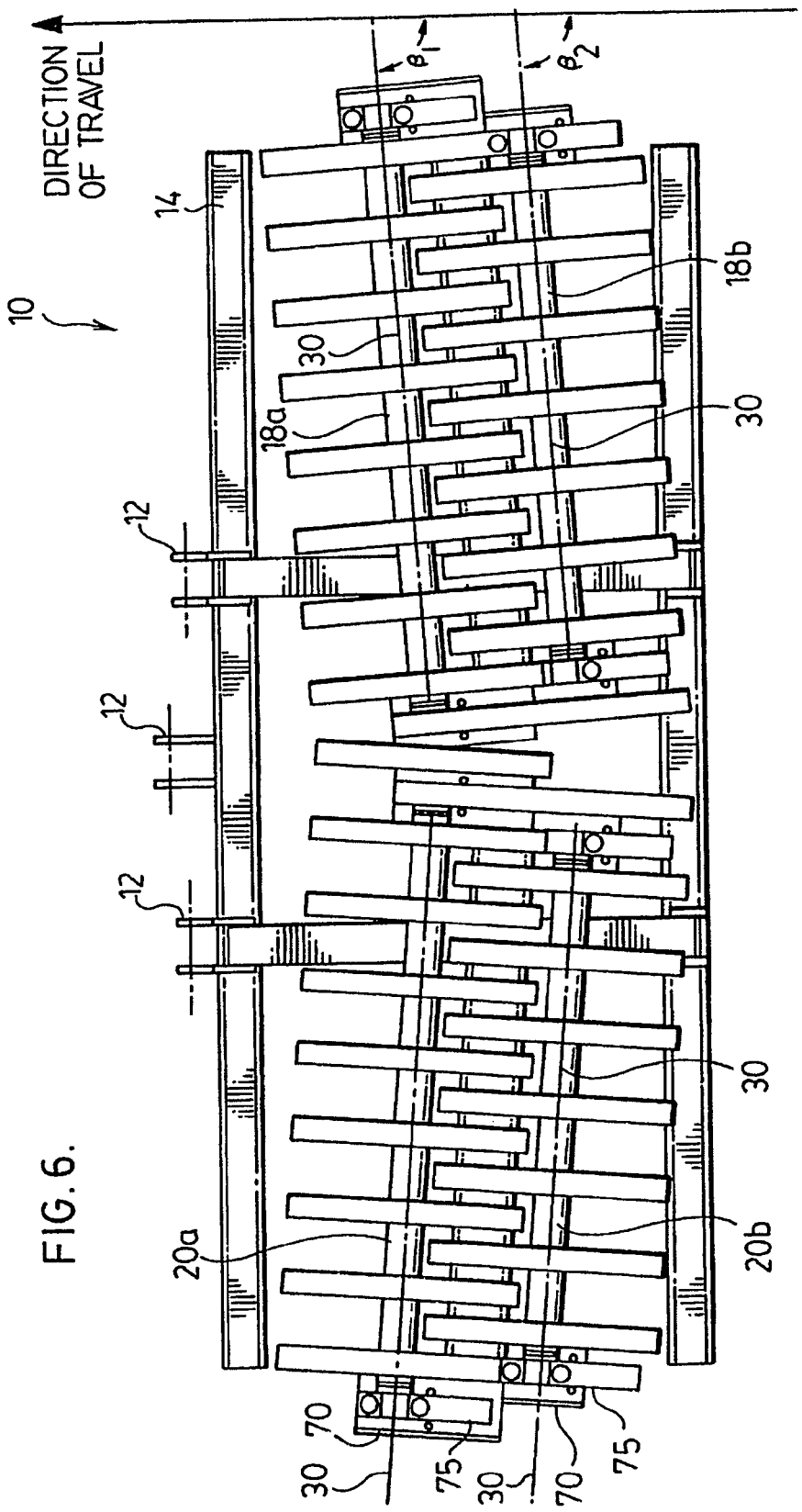
FIG. 6 is a top semi-schematic view of the embodiment of the invention shown in FIG. 5, taken in the direction of arrow "A"
Figure 7:
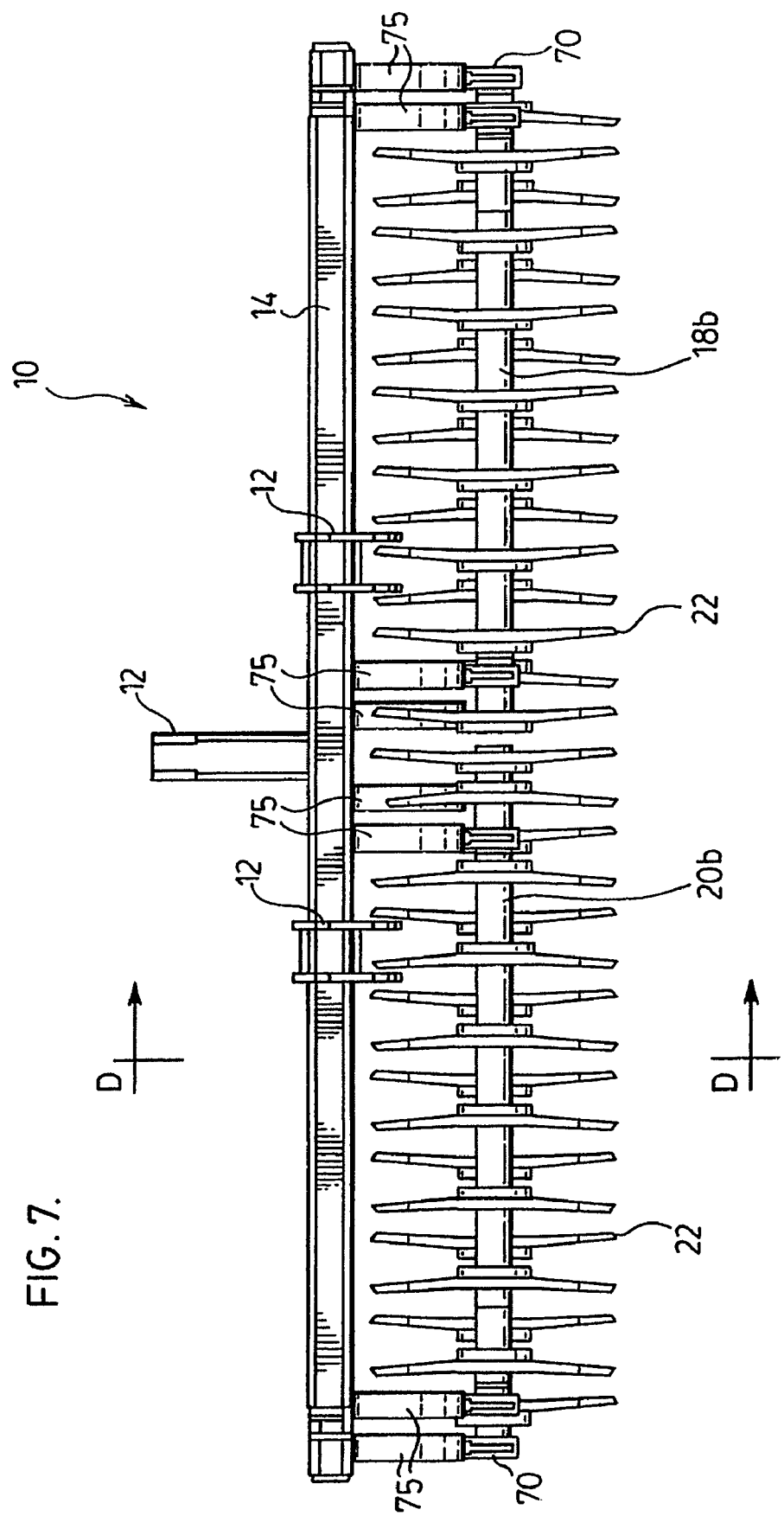
FIG. 7 is a rear view of the embodiments of the invention shown in FIGS. 3 & 5, taken in the direction of arrow 'B'.

As best seen from FIGS. 4 & 6, tines 22 mounted on forwardly-mounted rotatable shafts 18a, 20a, are longitudinally spaced along the respective longitudinal axis 30 thereof, and, due to the close mounting of shaft 18a to 18b, and shaft 20a to 20b, are adapted to interdigitate with tines 22 correspondingly longitudinally spaced along longitudinal axis of rearwardly-mounted shafts 18b, 20b.

Advantageously, when pairs of rotatable shafts 18a, 18b, and 20a, 20b forming part of aeration device 10 are pulled over the ground and rotate in the similar direction, interdigitating tines 22 on the trailing edge 50 of forwardly-mounted shafts 18a, 20a will be moving upwardly, thus drawing stalks of residual crops upwardly into an area of interdigitating tines. Similarly, interdigitating tines 22 on the leading edge 60 of rearwardly-mounted shafts 18b, 20b will be moving downwardly, thus cutting or mulching therebetween at locations of interdigitating tines 22, any stalks of residual crops which may be brought up into such location by upwardly moving tines 22 mounted on forwardly-mounted shafts 18a, 20a. Cut stalks then fall downwardly, and are thereafter pinned or pushed by tines 22 on rearwardly-mounted shafts 18b, 20b into soil 15 over which such device 10 is passed.

As best seen from FIGS. 8 & 9, tines 22 are generally pointed, and have a cutting edge 62 on a trailing edge thereof, adapted to penetrate and cut the soil for the purpose of aerating the soil, Cutting edge 62 further assists in cutting stalks of crop residues in the area of interdigitating tines 22, as explained above.

Tines 22 can be of a type known in the prior art. They may be bolted onto shafts 18a, 18b and 20a, 20 b as shown in FIGS. 8 & 9, either in a radial direction (FIG. 8) via bolts 47, or in an axial direction (FIG. 9) via bolt holes 48 and bolts (not shown). Alternatively, tines 22 may be integral with a hollow hub, as taught in U.S. Pat. No. 4,840,232 assigned to Holland Equipment Ltd (FIGS. 4, 5).

Typical suitable tines 22 for use on device 10 are tines manufactured by Holland Equipment Limited of Norwich, Ontario, under the following trademarks, namely Shatter-tine™, Sportstine™, and Finetine™.

Figure 3:
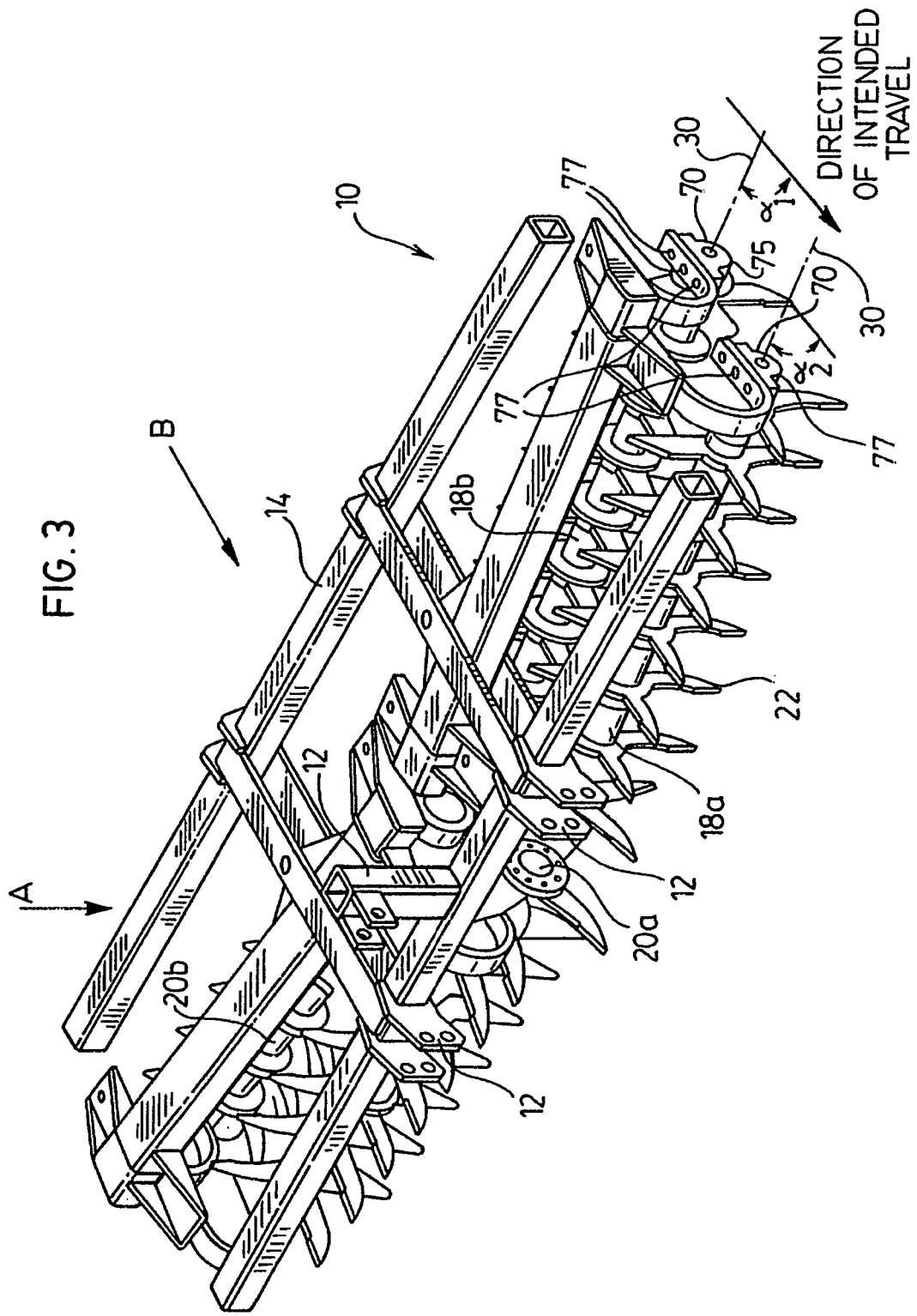
FIG. 3 is a perspective view of one embodiment of the agricultural implement of the present invention, having a pair of close-coupled transversely mounted rotatable shafts.
Figure 5:
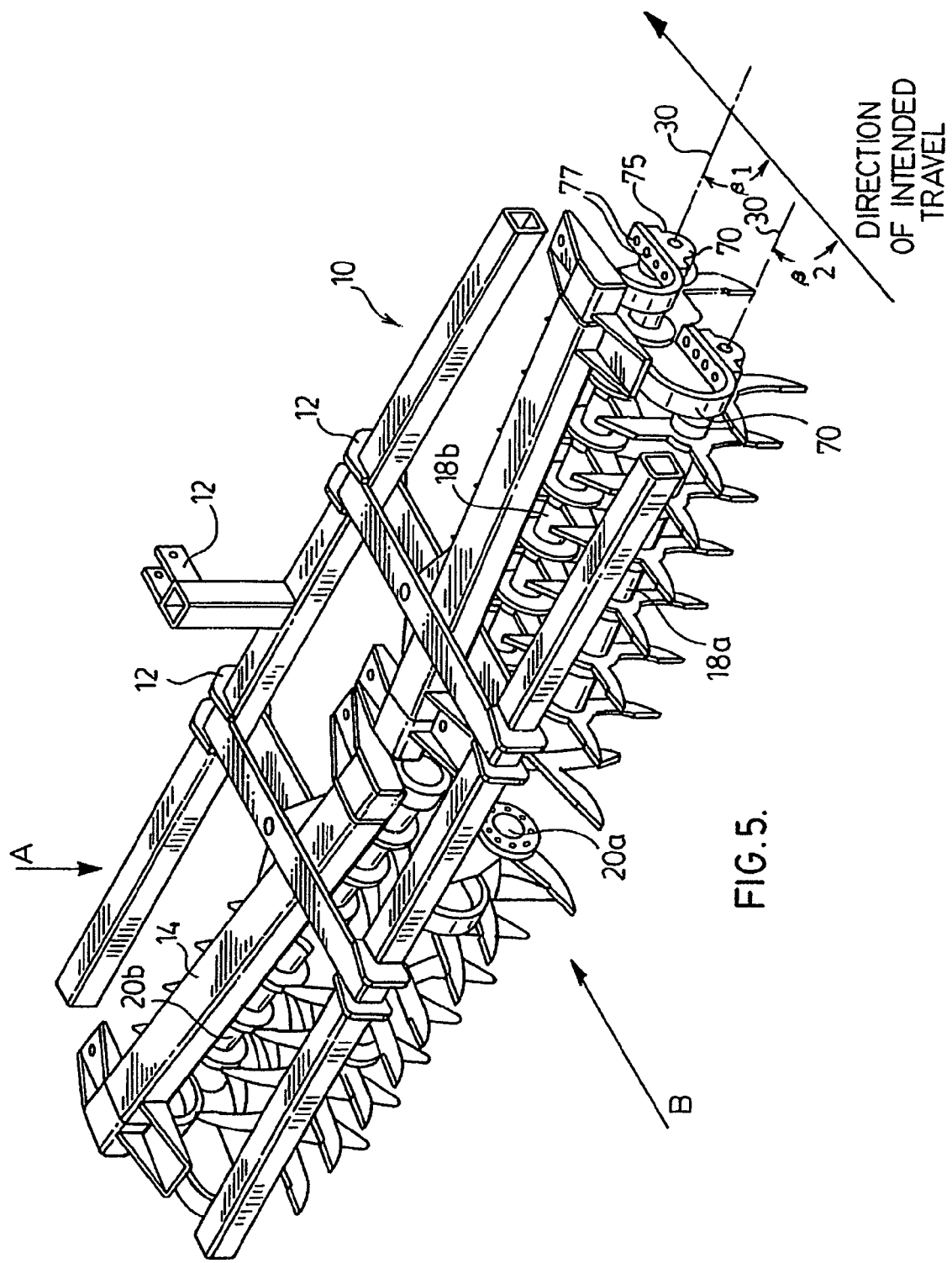
FIG. 5 is a perspective view of another embodiment of the agricultural implement of the present invention, similarly having a pair of close-coupled transversely mounted rotatable shafts.

The embodiment of the soil aeration device shown in FIGS. 3 & 4 is intentionally different than the embodiment of the aeration device shown in FIGS. 5 & 6, in that the pairs of rotatable shafts 18a, 18b and 20a, 20b shown in FIGS. 3 & 4 are inclined at a transverse angle $\alpha_1$, $\alpha_2$ to the direction of travel of the device, where $\alpha_1$, $\alpha_2$ are each in the range of approximately 45°-90°, and in the embodiment shown in FIGS. 3 & 4 is about 86°.

By way of contrast, with respect to the embodiment shown in FIGS. 5 & 6, the pairs of shafts 18a,18 b and 20a, 20b are each inclined at a transverse angle $\beta_1$, $\beta_2$ to the direction of travel, and is in the range of approximately 45°-90°, and in the embodiment shown in FIGS. 5 & 6 is about 85°.

In each of the two embodiments shown in FIGS. 3 & 4, and FIGS. 5 & 6, $\alpha_1$ is substantially equal to $\alpha_2$, and $\beta_1$ is substantially equal to $\beta_2$. This is to permit the shafts 18a, 18b, and 20a, 20b to be substantially parallel to permit respective tines on shafts 18a, 20a, to interdigitate with respective tines on shafts 18b, 20b respectively. Of course, the angle $\alpha_1$ need not be precisely equal to $\alpha_2$, and similarly $\beta_1$ need not be precisely equal to $\beta_1$, as due to the longitudinal spacing apart of the tines 22 along the longitudinal axis 30 of shafts 18a, 18b, and 20a, 20b, some non-parallel alignment of the pairs of shafts 18a, 18b, and 20a, 20b can be tolerated, and in some cases may be desired to assist in soil aeration, as long as interdigitation of the tines 22 on respective pairs of shafts 18a, 18b, and 20a, 20b can still be obtained without interference of tines 22 on such respective pairs of shafts.

Lastly, as may be seen from FIG. 3 and FIG. 5, it is contemplated that the respective transverse angles $\alpha_1$, $\alpha_2$ and $\beta_1$, $\beta_2$ for which respective rotatable shafts 18a, 18b, and 20a, 20b are inclined to the direction of travel may be adjustable, within a range of 45°-90°.

In this regard, by means of a series of bolt holes 77 on fame 14 (see FIGS. 3 & 5), endmounts 70 having bearing and bearing housings 75 therein may be adjustably positioned on frame 14, to permit adjustment of angles $\alpha_1$, $\alpha_2$ and $\beta_1$, $\beta_2$ and thus adjustment of the transverse angle of shafts 18a, 18b, and 20a, 20b, within a range of 45°-90°, and preferably within a range from about 80°-90°. It is noted that endmounts 70 at an end of shafts 18a, 18b, and 20a, 20b are adapted to permit some rotation which will result when the opposite end of shafts 18a, 18b, and 20a, 20b and the bearing mount 15 is adjustably positioned by means of bolt holes 77.

Although the disclosure described and illustrates preferred embodiments of the invention, it is to be understood that the invention is not limited to these particular embodiments. Many variations and modifications will now occur to those skilled in the art. For a complete definition of the invention and its intended scope, reference is to be made to the summary of the invention and the appended claims read together with and considered with the disclosure and drawings herein.

We claim:

1. An agricultural implement adapted for towing over ground, comprising:
    a frame defining an outermost width;
    at least a pair of juxtaposed, substantially parallel, spaced-apart rotatable shafts, comprising a first forwardly-mounted shaft and a second rearwardly-mounted shaft, each mounted on said frame and having a longitudinal axis at a transverse angle to an intended direction of travel of said implement, each of said rotatable shafts being non-powered and rotatable upon towing of said agricultural implement over said ground;
    a plurality of protruding tine members, extending substantially radially outwardly from each of said pair of shafts, longitudinally spaced along each of said pair of shafts, each tine member adapted to rotate about the longitudinal axis of a respective shaft, a tip of each of said tine members when rotating about said respective shaft creating a circular arc;
    an adjustment assembly adapted to adjust the transverse angle between the longitudinal axis of each of said shafts and said intended direction of travel of said implement, such that said shafts remain substantially parallel to one another through adjustment, and wherein the outermost width of the frame remains substantially constant through adjustment of the shafts, wherein said adjustment assembly includes a plurality of bolts and a plurality of bolt receiving apertures located within the frame, such that the bolts may be selectively positioned within the plurality of bolt receiving apertures, thereby adjusting the transverse angle; and
    said circular arcs of said tine members on one of said pair of shafts inter-digitating with a corresponding plurality of circular arcs of said tine members on said other of said pair of shafts.

2. The agricultural implement as claimed in claim 1, wherein said inter-digitating occurs at locations along a trailing edge of one of said pairs of shafts and along a leading edge of said other of said pair of shafts.

3. The agricultural implement as claimed in claim 1, wherein said tine members are adapted to contact the ground and penetrate the ground as the implement is towed over said ground.

4. The agricultural implement as claimed in claim 2, said tine members being substantially planar and having an cutting edge which engages and penetrates the ground, wherein said tine members of each of said shafts when said shafts are caused to rotate and pass over fields having crop residues thereon in the form of dried stalks, cut said stalks proximate said locations of inter-digitation.

5. An agricultural implement adapted for passage in an intended direction of travel over ground of a field having crop residues therein, comprising:
    a frame defining an outermost width;
    at least one pair of juxtaposed, substantially parallel, spaced-apart rotatable shafts, mounted on said frame, each having a longitudinal axis at a transverse angle of 45° -90° to said intended direction of travel of said implement, each of said rotatable shafts of said at least one pair of rotatable shafts being non-powered and each rotatable upon passage of said agricultural implement over said fields wherein said angle of transverse mounting of each longitudinal axis is adjustable;
    said pair of rotatable shafts each having a plurality of radially outwardly extending members adapted for engaging the ground, tips thereof when rotated about said respective shafts forming a circular arc, each of said tips contacting said field along a portion of said circular arc and thereby causing rotation of said rotatable shafts on which said outwardly extending members are respectively mounted;
    an adjustment assembly adapted to adjust the transverse angle between the longitudinal axis of each shaft and said intended direction of travel of said implement, such that said shafts remain substantially parallel to one another through adjustment, and wherein the outermost width of the frame remains substantially constant throughout adjustment of the shafts; and
    circular arcs of each of said outwardly extending members on one of said rotatable shafts intersecting circular arcs of outwardly extending members of a respective other of said rotatable shafts.

6. The agricultural implement as claimed in claim 5, wherein each of said rotatable shafts rotate in the same direction about their respective longitudinal axis.

7. The agricultural implement as claimed in claim 5, wherein said outwardly extending members penetrate and cut the ground and in doing so at least partially incorporate said crop residue into soil over which said implement passes.

8. An agricultural implement for chopping and mulching crop residues, adapted for passage over ground of a field containing said crop residues, comprising:
    a frame defining an outermost width;
    at least one pair of juxtaposed, substantially parallel, spaced-apart rotatable shafts, mounted on said frame and having a longitudinal axis at a transverse angle to a direction of travel of said implement, adapted for rotation in a substantially horizontal plane, each of said rotatable shafts of said at least one pair of rotatable shafts being non-powered and each rotatable upon passage of said agricultural implement over said field;

a plurality of protruding ground-penetrating members, extending substantially radially outwardly from each of said pair of shafts and longitudinally spaced along each of said pair of shafts, adapted to contact the ground and penetrate the ground as the implement is towed over said ground, each ground-penetrating member adapted to rotate about a longitudinal axis of a respective shaft, a tip of each of said ground penetrating members when rotating about said respective shaft creating a circular arc, each of said ground-penetrating members contacting said field along a portion of said circular arc and thereby causing rotation of said rotatable shaft on which said outwardly extending members are respectively mounted;

an adjustment assembly adapted to adjust the transverse angle, such that the shafts remain substantially parallel to one another through adjustment, and wherein the outermost width remains substantially constant through adjustment of the shafts, wherein said adjustment assembly includes a plurality of bolts and a plurality of bolt receiving apertures located within the frame, such that the bolts may be selectively positioned within the plurality of bolt receiving apertures, thereby adjusting the transverse angle; and circular arcs of each of said ground-penetrating members on one of said pair of shafts inter-digitating with circular arcs of each of said ground-penetrating members on said other of said pair of shafts; and wherein said ground-penetrating members of each of said shafts, when said shafts are caused to rotate and pass over said fields having crop residues thereon in the form of dried stalks, cut said stalks at locations of inter-digitation.

9. The agricultural implement as claimed in claim 8, wherein said ground-penetrating members at least partially incorporate said crop residue into soil over which said implement passes.

10. The agricultural implement as claimed in claim 1, 5, or 8, wherein said implement is further adapted to be mounted on and coupled to a 3-point hitch of a tractor.

11. An agricultural implement adapted for towing behind a tractor, further adapted to chop and mulch crop residues and further simultaneously partially incorporate said crop residue into soil when towed over soil, comprising:

a frame having an outermost width;

at least a pair of juxtaposed, substantially parallel, spaced-apart rotatable shafts, mounted on said frame, comprising a first forwardly-mounted shaft and a second rearwardly-mounted shaft, each having a longitudinal axis at a transverse angle of 45°-90° with respect to an intended direction of travel of said implement, each of said rotatable shafts of said at least one pair of rotatable shafts being non-powered and each rotatable upon towing of said agricultural implement over said soil;

said pair of rotatable shafts having a plurality of radially outwardly extending members having distal tips, said distal tips of said outwardly extending members when rotated about said respective shafts forming a circular arc, each of said tips contacting said soil along a portion of said circular arc and thereby causing rotation of said rotatable shafts on which said outwardly extending members are respectively mounted;

an adjustment assembly adapted to adjust the transverse angle, such that the shafts remain parallel to one another through adjustment, and wherein the outermost width of the frame remains substantially constant throughout adjustment of the shafts, wherein said adjustment assembly includes a plurality of bolts and a plurality of bolt receiving apertures located within the frame, such that the bolts may be selectively positioned within the plurality of bolt receiving apertures, thereby adjusting the transverse angle; and circular arcs of each of said outwardly extending members on one of said rotatable shafts intersecting circular arcs of outwardly extending members of a respective other of said rotatable shafts.

12. An agricultural implement adapted for towing over ground, comprising:

a frame;

a first pair of juxtaposed, substantially parallel, spaced-apart rotatable shafts, comprising a first forwardly-mounted shaft and a second rearwardly-mounted shaft, each mounted on said frame and having a longitudinal axis at a transverse angle to an intended direction of travel of the implement, each of the first pair of rotatable shafts being non-powered and rotatable upon towing of the agricultural implement over the ground;

a second pair of juxtaposed, substantially parallel, spaced-apart rotatable shafts, comprising a third forwardly-mounted shaft and a fourth rearwardly-mounted shaft, each mounted on the frame and having a longitudinal axis at a transverse angle to an intended direction of travel of the implement, each of the second pair of rotatable shafts being non-powered and rotatable upon towing of the agricultural implement over the ground;

a plurality of protruding tine members, extending substantially radially outwardly from each of the shafts, longitudinally spaced along each of the shafts, each tine member adapted to rotate about the longitudinal axis of a respective shaft, a tip of each of the tine members when rotating about the respective shaft creating a circular arc;

an adjustment assembly adapted to adjust the transverse angle between the longitudinal axis of each of said shafts and the intended direction of travel of the implement, such that the first and second shafts remain substantially parallel to one another through adjustment and the third and fourth shafts remain substantially parallel to one another through adjustment, and wherein the transverse angle between the longitudinal axis of the first and second shafts and the intended direction of travel of the implement is independently adjustable from the transverse angle between the longitudinal axis of the third and fourth shafts and the intended direction of travel of the implement; and wherein the circular arcs of the tine members of the first shaft inter-digitate with the circular arcs of the tine members of the second shaft, and wherein the circular arcs of the tine members of the third shaft inter-digitate with the circular arcs of the tine members of the fourth shaft.

13. The agricultural implement as claimed in claim 12, wherein the frame defines an outermost width of the implement, and wherein the outermost width of the frame remains substantially constant through adjustment of the shafts.

14. The agricultural implement as claimed in claim 12, wherein the inter-digitating occurs at locations along a trailing edge of the first shaft and along a leading edge of the second shaft, and wherein the inter-digitating occurs at locations along a trailing edge of the third shaft and along a leading edge of the fourth shaft.

15. The agricultural implement as claimed in claim 12, wherein the tine members are adapted to contact the ground and penetrate the ground as the implement is towed over the ground.

16. The agricultural implement as claimed in claim 12, the tine members are substantially planar and include a cutting edge which engages and penetrates the ground, wherein the tine members of each of the shafts when the shafts are caused to rotate and pass over fields having crop residues thereon in the form of dried stalks, cut the stalks proximate the locations of inter-digitation.

\* \* \* \* \*